United States Patent [19]

Morioka et al.

[11] Patent Number: 4,864,421
[45] Date of Patent: Sep. 5, 1989

[54] SYSTEM FOR CONNECTING A VIDEO SIGNAL RECORDING/REPRODUCING APPARATUS AND A TELEVISION RECEIVER

[75] Inventors: Yoshihiro Morioka, Neyagawa; Masaaki Kobayashi, Kawanishi; Akihiro Takeuchi, Ikoma; Yoshitomi Nagaoka, Neyagawa; Noriaki Gentsu; Sakon Nagasaki, both of Katano, all of Japan

[73] Assignee: Matsushita Electric Industrial Co., Ltd., Kadoma, Japan

[21] Appl. No.: 92,878

[22] Filed: Sep. 3, 1987

[30] Foreign Application Priority Data

Sep. 9, 1986 [JP] Japan .................................. 61-212243
Apr. 22, 1987 [JP] Japan .................................. 62-98909

[51] Int. Cl.$^4$ ............................................. H04N 9/79
[52] U.S. Cl. ..................................... 358/310; 358/181; 358/384; 358/335
[58] Field of Search ....................... 358/11, 12, 31, 37, 358/86, 310, 319, 328, 335, 330, 334, 906, 181

[56] References Cited

U.S. PATENT DOCUMENTS 4,802,000 1/1989 Willis ..................................... 358/31

FOREIGN PATENT DOCUMENTS

1482079 8/1977 United Kingdom .

Primary Examiner—Michael L. Gellner
Assistant Examiner—David M. Gray
Attorney, Agent, or Firm—Wenderoth, Lind & Ponack

[57] ABSTRACT

In a system for connecting a video signal recording/reproducing apparatus and a color TV receiver, two component signals—a luminace signal and a carrier chrominance signal—are transmitted separately from each other from the video signal recording/reproducing apparatus to the TV receiver. The video signal recording/reproducing apparatus has first and second output terminals for respectively outputting luminance and carrier chrominance signals obtained from a color video signal reproduced from a recording medium. The color TV receiver has first and second input terminals adapted to be respectively connected to the first and second output terminals of the video signal recording/reproducing apparatus for receiving the luminace and carrier chrominance signals. The color TV receiver may be provided with a switching circuit for selecting a composite video signal received in the conventional manner or the separately received two component signals.

19 Claims, 5 Drawing Sheets

SYSTEM FOR CONNECTING A VIDEO SIGNAL RECORDING/REPRODUCING APPARATUS AND A TELEVISION RECEIVER

BACKGROUND OF THE INVENTION

1. Field of the Invention

This invention relates to a color video signal transmission from a video signal recording/reproducing apparatus such as a video tape recorder and a video disc player to a color television receiver for displaying a color video signal reproduced from a recording medium such a magnetic tape and an optical disc on a television screen.

2. Description of the Prior Art

The conventional video tape recorder (VTR) has a VIDEO OUTPUT terminal for outputting therefrom a composite video signal of base band in which luminance and carrier chrominance signals of a color video signal are frequency-multiplexed. The conventional television (TV) receiver has a VIDEO INPUT terminal for receiving thereat the composite video signal. To display a color video signal reproduced at the VTR from a magnetic tape on the CRT screen of the TV receiver, the VIDEO OUTPUT terminal of the VTR and the VIDEO INPUT terminal of the TV receiver are connected to each other with a connection cable.

More specifically, the conventional video signal recorder has a reproduced video signal processing circuit for processing a reproduced signal from a magnetic tape to obtain a luminance signal and a carrier chrominance signal, and a mixing circuit for mixing the luminance and carrier chrominance signals to obtain a composite video signal which is fed to the VIDEO OUTPUT terminal. The composite video signal is transmitted from the VIDEO OUTPUT terminal to the VIDEO INPUT terminal of the conventional TV receiver through the connection cable. The TV receiver has a separating circuit connected to the VIDEO INPUT terminal for separating the composite video signal into the luminance and carrier chrominance signals, and a video signal processing circuit for processing the separated luminance and carrier chrominance signals to obtain R, G, B color signals which are fed to the CRT to produce a color image on the CRT screen.

Since the TV receivers having the above-described configuration have been widely spread, other conventional video signal recorders than VTRs, such as video disc players, have the above-described configuration for the connection to the TV receivers.

However, the above-described conventional connection system between a video signal recorder and a TV receiver has the following problems:

(1) Since the luminance and carrier chrominance signals are frequency-multiplexed to obtain the composite video signal at the recorder side and the composite video signal is frequency-separated to recover the luminance and carrier chrominance signals at the TV receiver side, the circuits for the frequency-multiplexing and frequency-separation would cause waveform distortion of the transmitted signal due to variations of the characteristics of filters and amplifiers and cause circuit noises which interfere with the transmitted signal. Thus, the quality of the transmitted signal would be largely degraded.

(2) In the case of the NTSC system, since the luminance and carrier chrominance signals are frequency-multiplexed so as to be interleaved on frequency axis to each other, the luminance and chrominance signals would interfere with each other to cause the cross-color and cross-luminance noises which affect badly the quality of the displayed image.

(3) Since the frequency bands of the luminance and carrier chrominance signals in the transmitted composite video signal are standardized (e.g., 4.2 MHz for the luminance signal and 0.5 MHz for the carrier chrominance signal in the NTSC system), wider band luminance and carrier chrominance signals than the standardized band cannot be transmitted. Even if the reproduced luminance and carrier chrominance signals from the reproduced video signal processing circuit of the video signal recorder are wide band signals, which can provide a high quality image, such wide band signals must be limited in band to the standardized narrower band signals before frequency-multiplexed to the composite video signal. The band limited signals cannot provide the high quality image which could be provided by the original wide band signals.

SUMMARY OF THE INVENTION

An object of the present invention is to provide a connection system capable of transmitting a wide band, high quality color video signal from a video signal recording/reproducing apparatus to a TV receiver.

In a connecting system according to the present invention, a video signal recording/reproducing apparatus has a luminance signal output terminal for outputting a luminance signal and a chrominance signal output terminal for outputting a carrier chrominance signal, and a color TV receiver has a luminance signal input terminal connected via a connection line to the luminance signal output terminal of the video signal recording/reproducing apparatus for receiving the luminance signal and a chrominance signal input terminal connected via a connection line to the chrominance signal output terminal of the video signal recording/reproducing apparatus for receiving the carrier chrominance signal.

The video signal recording/reproducing apparatus comprises a reproducing head for reproducing a color video signal recorded on a recording medium from the recording medium, a video signal processing circuit for processing the reproduced color video signal to obtain the luminance signal and the carrier chrominance signal of the video signal, a filter for passing the luminance signal so that the luminance signal has a predetermined frequency band, and a filter for passing the carrier chrominance signal so that the carrier chrominance signal has a predetermined frequency band, the luminance and carrier chrominance signals passed through the respective filters being fed to the luminance and chrominance signal output terminals, respectively. The color TV receiver comprises a video signal processing circuit having luminance and chrominance signal input terminals which are respectively connected to the luminance and chrominance signal input terminals of the TV receiver for processing the luminance and carrier chrominance signals to obtain R, G, B signals of the color video signal, and a display means receiving the R, G, B signals for displaying an image corresponding to the color video signal.

As described above, according to the present invention, a color video signal is transmitted from a video signal recording/reproducing apparatus to a color TV receiver in the form of separated component signals: the luminance signal and the carrier chrominance signal. Therefore, a wider frequency band transmission than the conventional frequency band transmission restricted by the standard such as NTSC is possible. Further, such mutual interferences as cross-color and cross-luminance between the luminance and chrominance signals will not occur. Furthermore, the circuit noises can be remarkably reduced. As a result, a high quality color video signal transmission can be realized. The present invention can be applied not only to the convention color TV system, but also to the developing future TV system such as EDTV (Extended Definition TV) and HDTV (High Definition TV) systems.

Further, the present invention can provide a connection system compatible with the conventional connection system between a video signal recording/reproducing apparatus and a color TV receiver by slightly modifying the conventional video signal recording/reproducing apparatus and conventional color TV receiver. That is, the conventional video signal recording/reproducing apparatus having the luminance and carrier chrominance signal mixing circuit and the VIDEO OUTPUT terminal to which the composite video signal from the mixing circuit is applied is additionally provided with the chrominance and chrominance signal output terminals to which the luminance signal and carrier chrominance signals are applied, respectively. On the other hand, the conventional color TV receiver having the VIDEO INPUT terminal for receiving the composite video signal and the signal separation circuit for separating the received composite video signal into the luminance and carrier chrominance signals is additionally provided with the luminance and chrominance signal input terminals for respectively receiving the luminance and carrier chrominance signals and a switching circuit for selecting one of the luminance and carrier chrominance signal pair from the signal separation circuit and the luminance and carrier chrominance signal pair from the luminance and carrier chrominance signal input terminals to supply the selected pair to the video signal processing circuit.

The above and other objects and features of the present invention will be apparent from the following description of the preferred embodiments taken in connection with the accompanying drawings in which:

DESCRIPTION OF THE PREFERRED EMBODIMENTS

Figure 1:
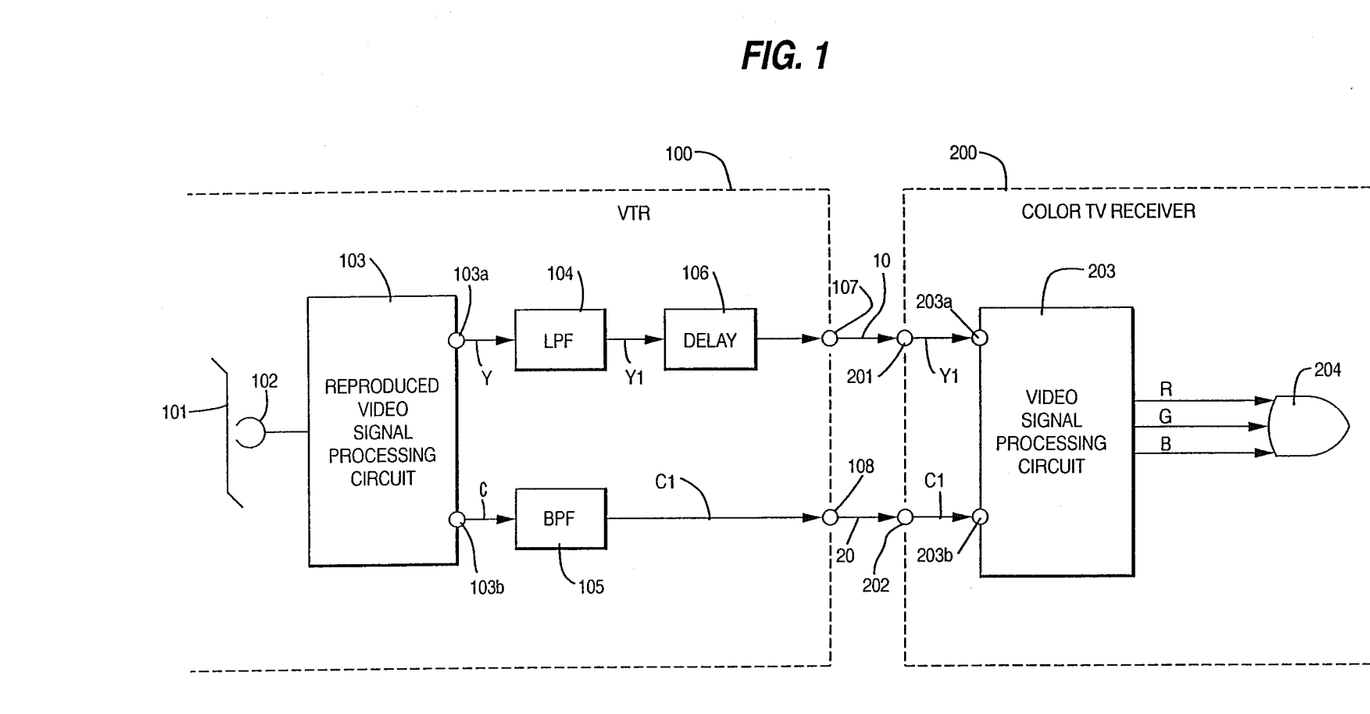
FIG. 1 is a schematic block diagram showing a system for connecting a VTR and a color TV receiver as an embodiment of the present invention.
Figure 3A:
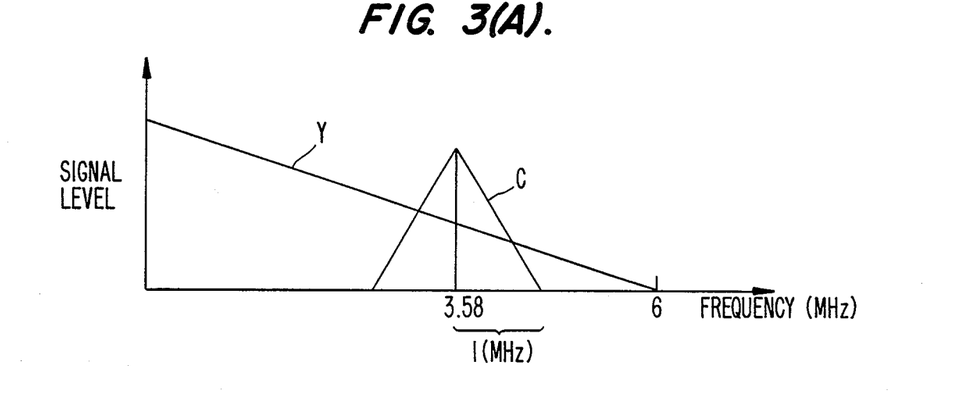
FIG. 3 shows frequency characteristics of the processed color video signals for explaining the operations of the embodiments in FIGS. 1 and 2.

FIG. 1 shows a system for connecting a VTR 100 and a color TV receiver 200 as an embodiment of the present invention. The VTR 100 has a magnetic head 102 for recording a color video signal onto a magnetic tape 101 and reproducing the recorded color video signal from the magnetic tape 101. Although the magnetic head 102 is illustrated as a single head for simplicity, it actually comprises one or more pairs of rotary heads mounted on a rotary cylinder. The reproduced color video signal from the magnetic head 102 is processed in the ordinarily known manner in a reproduced video signal processing circuit 103 so that a luminance signal Y and a carrier chrominance signal C as shown in FIG. 3(A) are obtained respectively at output terminals 103a and 103b of the processing circuit 103. Since the reproduced video signal processing circuit like this in a VTR is well known, the internal configuration of the processing circuit 103 may be easily understood by those skilled in the art without a further explanation.

Figure 3B:
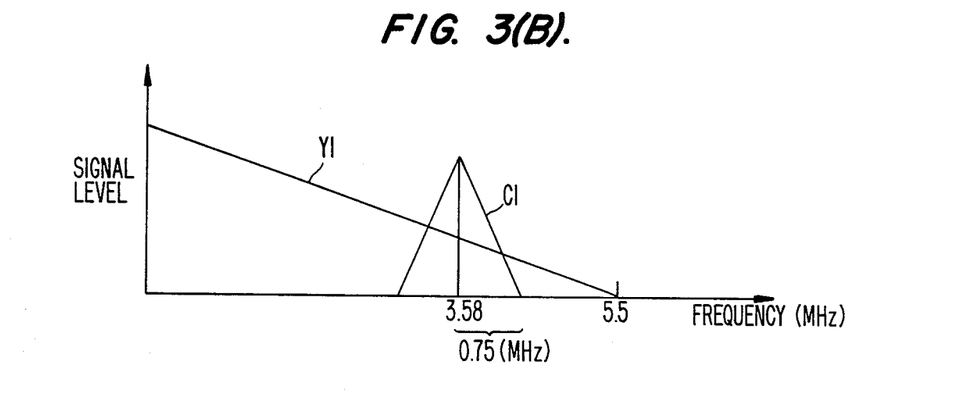

As shown in FIG. 3(A), for example, the luminance signal Y has a frequency band of 6 [MHz] and the carrier chrominance signal C has a color subcarrier frequency of 3.5 [MHz] (more accurately, 3.579545 [MHz]) and a band width of 1 [MHz]. The luminance signal Y from the terminal 103a is passed through a low-pass filter (LPF) 104 to become a luminance signal Y11 having a predetermined frequency band of, for example, 5.5 [MHz] as shown in FIG. 3(B). The carrier chrominance signal C from the terminal 103b is passed through a band-pass filter (BPF) 105 to become a carrier chrominance signal C1 having a predetermined band width of, for example, 0.75 [MHz] as shown in FIG. 3(B). It is necessary to allow the luminance and carrier chrominance signals outputted from the VTR to have predetermined frequency bands for standardization.

The luminance signal Y1 is fed through a delay circuit 106 to a luminance signal output terminal 107 of the VTR 100. The carrier chrominance signal C1 is fed to a chrominance signal output terminal 108 of the VTR 100. The delay circuit 106 is provided for correcting a time-base error between the luminance and carrier chrominance signals Y1 and C1, which would be caused during the previous signal processing stage. The case in FIG. 1 is that the luminance signal Y1 is leading against the carrier chrominance signal C1. There would be a case, due to the previous stage circuit configuration, that the carrier chrominance signal C1 would lead against the luminance signal Y1, in which case the delay circuit 106 will be removed and a delay circuit is inserted between the BFF 105 and the chrominance signal output terminal 108. Also, there would be a case that no time-base error would occur between the two component signals Y1 and C1, in which case no time-base error correcting circuit like the delay circuit 106 will be necessary. Moreover, the time-base error correction may be performed at the TV receiver side. Anyway, the delay circuit 106 is not always necessary in the connecting system of the invention.

The color TV receiver 200 has a luminance signal input terminal 201 for receiving the luminance signal Y1 and a chrominance signal input terminal 202 for receiving the carrier chrominance signal C1. The luminance signal output terminal 107 of the VTR 100 and the luminance signal input terminal 201 of the TV receiver 200 are connected to each other with a luminance signal transmission line 10. The chrominance signal output terminal 108 of the VTR 100 and the chrominance signal input terminal 202 of the TV receiver 200 are connected to each other with a chrominance signal transmission line 20. The transmission lines 10 and 20 may be located either within two separate cables or within a single cable. Of course, each of the terminals 107, 108, 201 and 202 has a counterpart ground terminal and each of the lines 10 and 20 has a counterpart ground line, although such ground terminals and lines are not illustrated in FIG. 1 for simplicity.

The luminance and chrominance signal input terminals 201 and 202 are connected respectively to input terminals 203a and 203b of a video signal processing circuit 203 in the color TV receiver 200. The processing circuit 203 processes the received luminance and carrier chrominance signals Y1 and C1 in the ordinary known manner to obtain the three color signals - R, G, B signals -, which are applied to a CRT 204 to produce an image on the CRT screen. Such processing circuit as the processing circuit 203 is well-known and thus it may not be necessary to explain the detail of the internal configuration of the processing circuit 203.

As described above, the color video signal transmission from the VTR 100 to the color TV receiver is performed in the form of two component signals of the video signal—the luminance signal and the carrier chrominance signal—which are separated from each other. Since the transmitted two component signals are subjected to no frequency multiplexing process in the VTR and no frequency separation process in the TV receiver, they are free from signal distortions and circuit noises which would be caused by the signal mixing and separation circuits. Further, mutual crosstalks between the two component signals will hardly occur. Therefore, the connection system transmits the two component signals of the reproduced color video signal from the VTR to the color TV receiver without substantially loosing the high quality of the reproduced color video signal.

The VTR 100 may be any type of VTR including the VHS-VTR, β-VTR and 8 mm-VTR. Further, the configuration in the VTR 100 related to the connection system of the invention can be applied to the other video signal recording/reproducing apparatus such as a VHD video disc player using an electrostatic capacitance detecting head and an optical vide player using an optical head.

Figure 2:
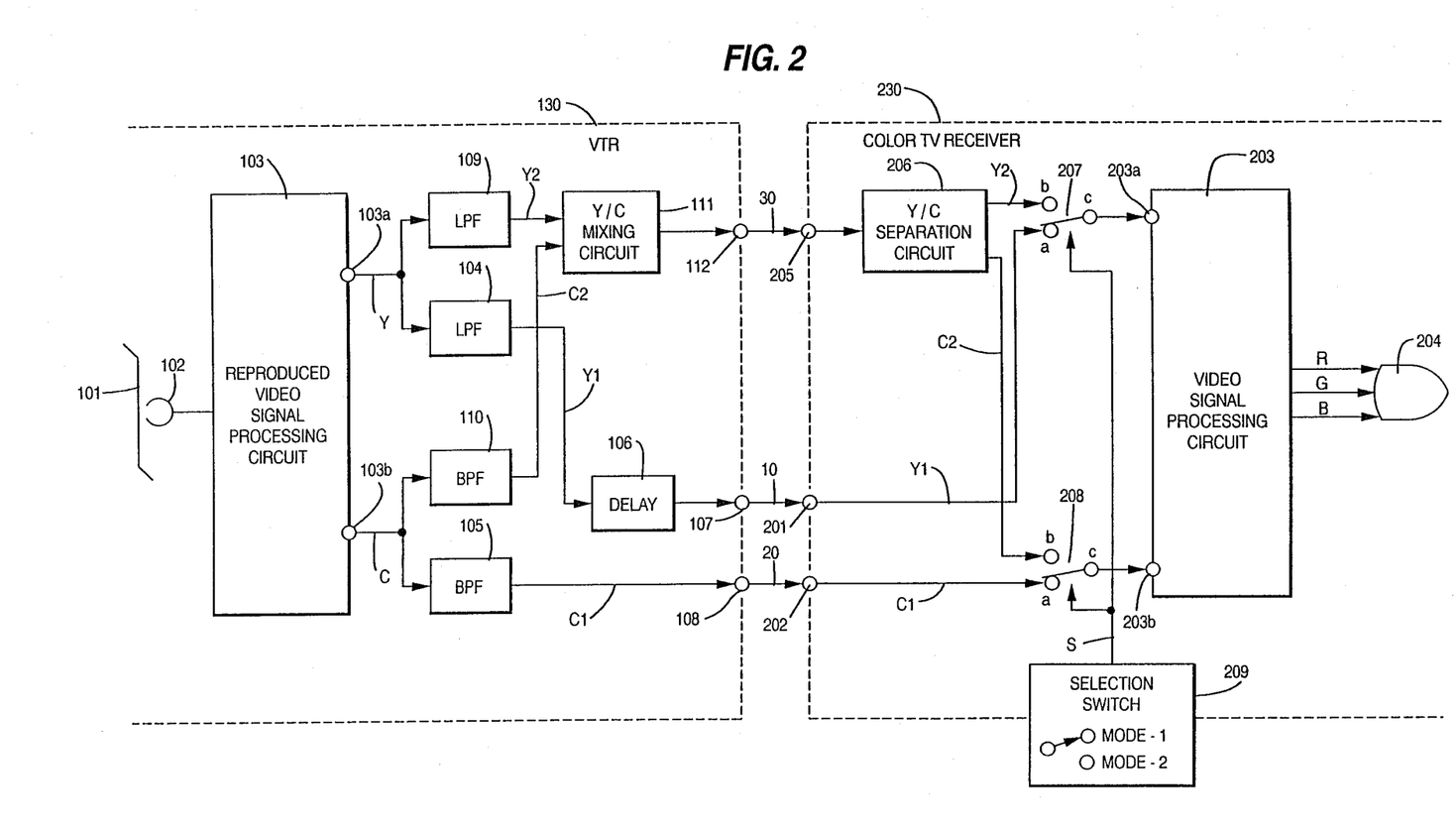
FIG. 2 is a schematic block diagram showing a system for connecting a VTR and a color TV receiver compatible with the conventional system as another embodiment of the present invention.

FIG. 2 shows a system for connecting a VTR 130 and a color TV receiver 230 as another embodiment of the present invention. The connection system, VTR 130 and TV receiver 230 in FIG. 2 are respectively compatible with the conventional connection system, VTR and TV receiver. The elements referred to by the same reference numbers in FIG. 1 and FIG. 2 are respectively same each other in configuration and function.

Figure 3C:
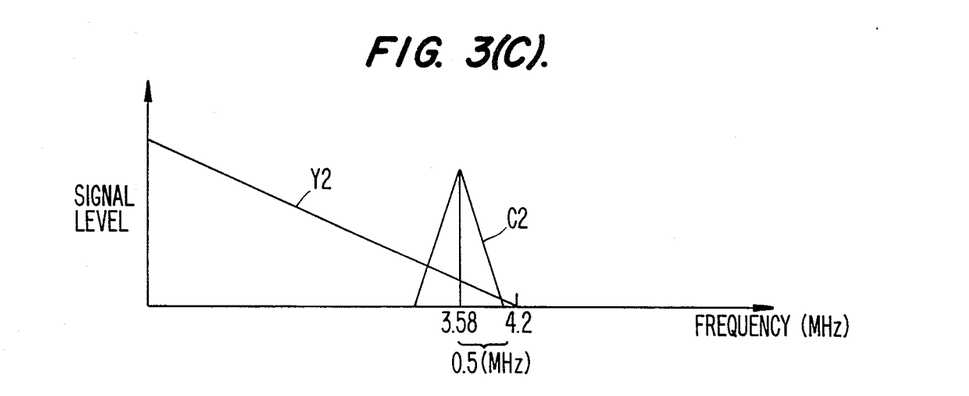

The VTR 130 has, in addition to the VTR 100 in FIG. 1, a low-pass filter (LPF) 109, a band-pass filter (BPF) 110, a Y/C mixing circuit 111 and a VIDEO OUTPUT terminal 112, which are provided in the conventional NTSC system VTR. The LPF 109 limits the frequency band of the luminance signal Y (FIG. 3(A)) from the output terminal 103a of the reproduced signal processing circuit 103 to 4.2 [MHz] ruled by the NTSC Standard to obtain an NTSC luminance signal Y2 as shown in FIG. 3(C). The BPF 110 limits the band width of the carrier chrominance signal signal C (FIG. 3(A)) from the output terminal 103b of the processing circuit 103 to 0.5 [MHz] ruled by the NTSC Standard to obtain an NTSC carrier chrominance signal C2 as shown in FIG. 3(C). The Y/C mixing circuit 111 mixing the NTSC luminance and carrier chrominance signals Y2 and C2 by frequency-multiplexing process to obtain an NTSC composite video signal, which is fed to the VIDEO OUTPUT terminal 112. The LPF 104, BPF 105, delay circuit 106 and output terminals 107, 108 are the same as those explained in connection with FIG. 1.

From the view point of the conventional VTR, the VTR 130 in FIG. 2 additionally has the luminance and chrominance signal output terminals 107 and 108, and the circuits 104, 105 and 106 associated with the additional two output terminals. The passing band of the LPF 104 is wider than that of the LPF 109, and the passing band of the BPF 105 is wider than that of the BPF 110 in the embodiment. According to the requirement determined by the design or standard of the TV receiver side, the passing bands of the LPF 104 and BPF 105 may be set equal to or wider than those of the LPF 109 and BPF 110, respectively.

The color TV receiver 230 has, in addition to the TV receiver 200 in FIG. 1, a VIDEO INPUT terminal 205, a Y/C separation circuit 206, change-over switches 207 and 208 and a manual selection switch 209. The VIDEO INPUT terminal 205 is connected to the VIDEO OUTPUT terminal 112 of the VTR 130 with a composite video signal transmission line 30 for receiving the NTSC composite video signal. The Y/C separation circuit 206 is connected to the VIDEO INPUT terminal 205 and separates the received NTSC composite video signal into the NTSC luminance and carrier chrominance signals Y2 and C2, which are respectively fed to second input terminals b of the change-over switches 207 and 208. The luminance signal Y1 received at the luminance input terminal 201 is fed to a first input terminal a of the change-over switch 207, and the carrier chrominance signal C1 received at the chrominance input terminal 202 is fed to a first input terminal a of the change-over switch 208. The change-over switches are connected at their respective output terminals c to the input terminals 203a and 203b, respectively, of the video signal processing circuit 203.

The manual selection switch 209 is manually operated to select a mode-1 for receiving the component signals Y1 and C1 and a mode-2 for receiving the composite video signal, and outputs a selection signal S indicative of the selected mode by its level ("HIGH" or "LOW"). Each of the change-over switches 207 and 208 is responsive to the selection signal S for turning to select the first input terminal a when the selection signal S indicates the mode-1 (for example, S is "HIGH") and turning to select the second input terminal b when the selection signal S indicates the mode-2 (for example, S is "LOW"). In other words, when the mode-1 is selected, the luminance signal Y1 and the carrier chrominance signal C1 are respectively fed to the input terminals 203a and 203b of the video signal processing circuit 203, and when the mode-2 is selected, the NTSC luminance signal Y2 and the NTSC carrier chrominance signal C2 are respectively fed to the input terminals 203a and 203b of the processing circuit 203.

From the view point of the conventional color TV receiver, the color TV receiver 230 additionally has the luminance and chrominance signal input terminals 201 and 202, and the switches 207, 208, 209 which are associated with the additional input terminals.

The system in FIG. 2 operates in the conventional manner by connecting the VIDEO OUTPUT terminal 112 of the VTR 130 to the VIDEO INPUT terminal 205 of the color TV receiver 230 and selecting the mode-2 of the manual selection switch 209 of the color TV receiver 230. Alternatively, by connecting the luminance and chrominance output terminals 107 and 108 of the VTR 130 respectively to the luminance and chrominance input terminals 201 and 202 of the color TV receiver 230, the system in FIG. 2 operates in the same manner as that of the system in FIG. 1 to effect the high quality color video signal transmission as explained in connection with the FIG. 1 system.

As described before in connection with FIG. 1, the delay circuit 106 in FIG. 2 is not always necessary, and may be removed at need. Further, the composite video signal processed in the conventional mode is the NTSC signal in the embodiment of FIG. 2, but it may be any other system signal such as the PAL system signal and the SECAM system signal.

Figure 4:
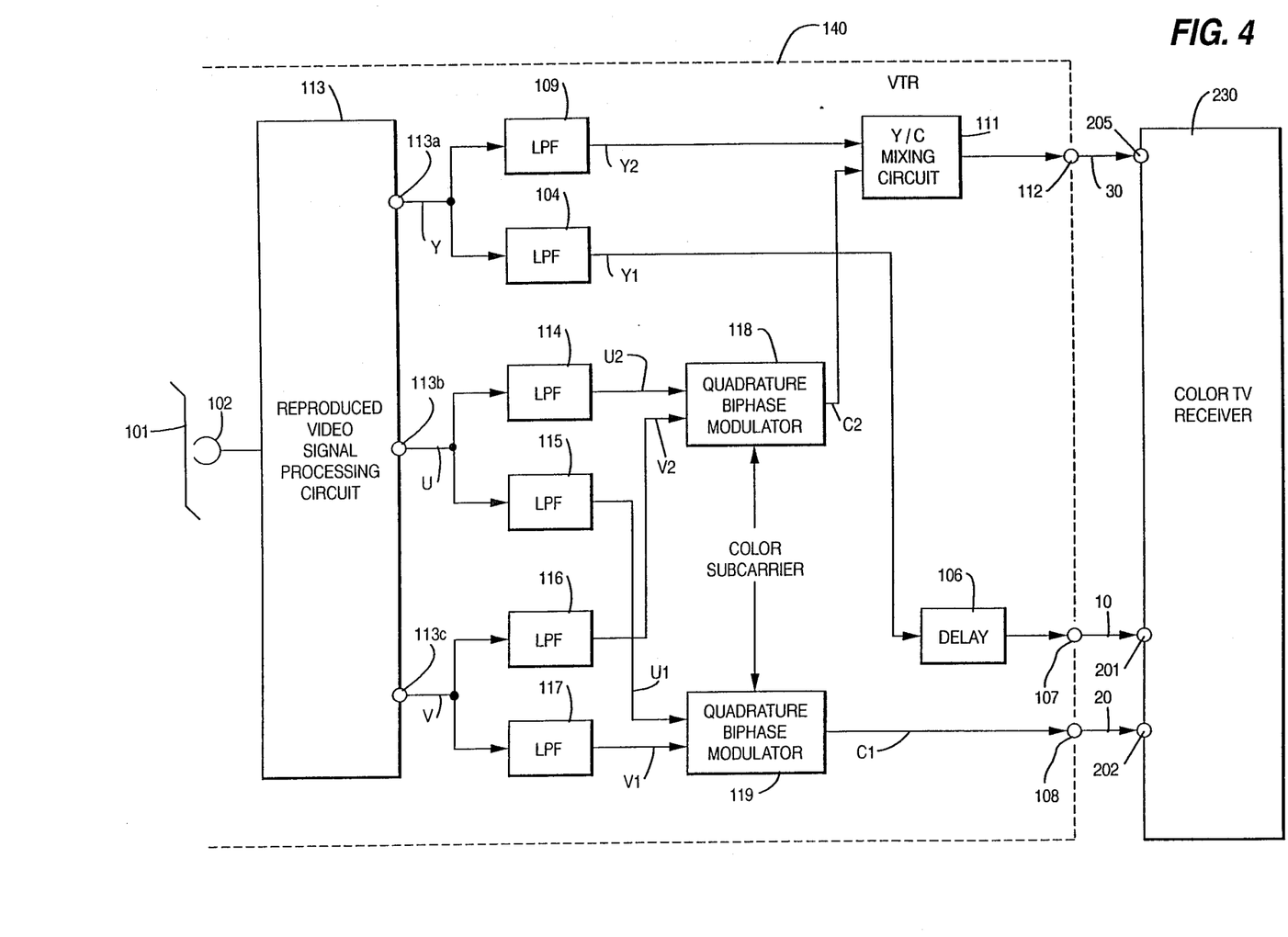
FIG. 4 is a schematic block diagram showing a system for connecting a VTR and a color TV receiver as still another embodiment of present invention.

FIG. 4 shows a system for connecting a VTR 140 and a color TV receiver 230 as still another embodiment of the present invention. This system is also compatible with the conventional connection system, including the compatibilities of the individual VTR 140 and TV receiver 230 with the conventional VTR and color TV receiver. The color TV receiver 230 in FIG. 4 is identical with the color TV receiver 230 in FIG. 2, and thus repetitive explanation thereof will be omitted. The other elements referred to by the same reference numbers as those in FIG. 2 are identical with those in FIG. 2.

Figure 5A:
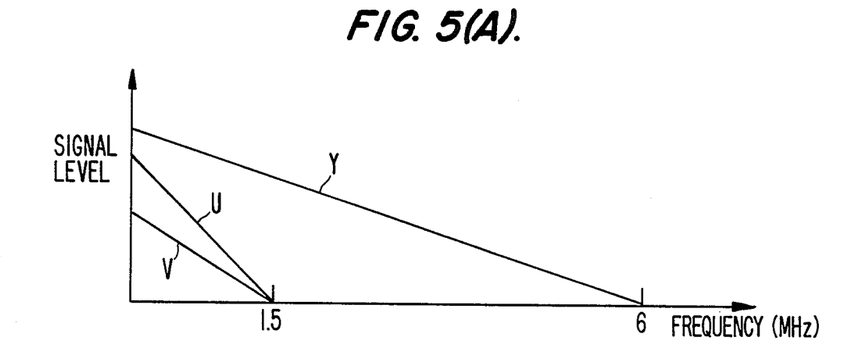
FIG. 5 shows frequency characteristics of the processed color video signals for explaining the operation of the embodiment in FIG. 4.

The VTR 140 has a reproduced video signal processing circuit 113 which processes the reproduced color video signal from the magnetic head 102 in the ordinary known manner to obtain, at its respective output terminals 113a, 113b and 113c, a luminance signal Y, a chrominance difference signal U (B-Y) and a chrominance difference signal V (R-Y), as shown in FIG. 5(A). Such a reproduced video signal processing circuit as the processing circuit 113 used in a VTR is well-known and thus the internal configuration and operation of the processing circuit 113 may be apparent for those skilled in the art without a further explanation. The frequency band of the luminance signal Y is 6 [MHz], for example, and the frequency band of each of the chrominance difference signals U and V is 1.5 [MHz], for example.

Figure 5B:
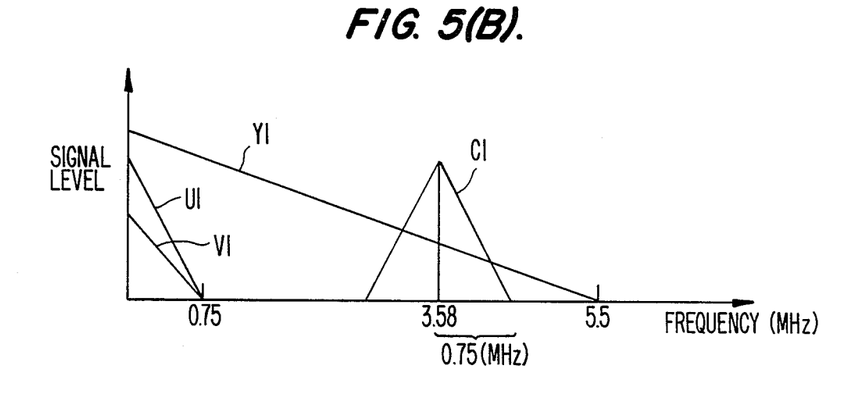
Figure 5C:
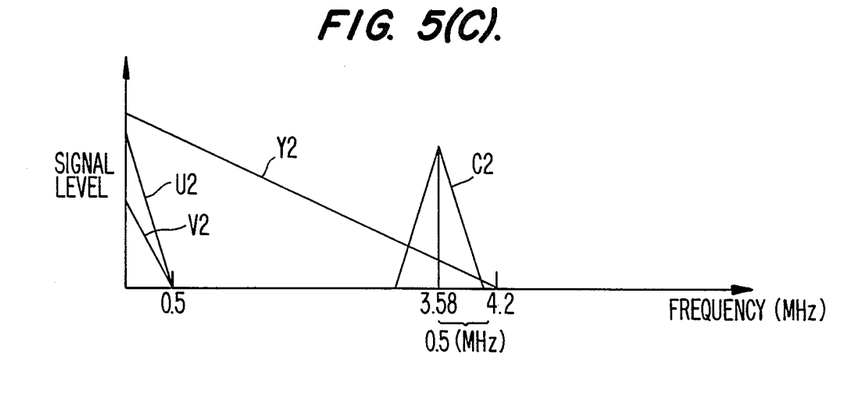

The luminance signal Y is passed through a LPF 104 to become a luminance signal Y1 having a predetermined frequency band of, for example, 5.5. [MHz] as shown in FIG. 5(B), and through a LPF 109 to become an NTSC luminance signal Y2 having the frequency band of 4.2 [MHz] as shown in FIG. 5(C), in the same way as the embodiments FIG. 2. The luminance signal Y1 is fed through a delay circuit 106 to a luminance signal output terminal 107 of the VTR 140.

The chrominance difference signal U is passed through a LPF 115 to become a chrominance difference signal U1 having a predetermined frequency band of, for example, 0.75 [MHz] as shown in FIG. 5(B), and through a LPF 114 to become a chrominance difference signal U2 having a frequency band of 0.5 [MHz] as shown in FIG. 5(C). The chrominance difference signal U is passed through a LPF 117 to become a chrominance difference signal V1 having a predetermined frequency band of, for example, 0.75 [MHz] as shown in FIG. 5(B), and through a LPF 116 to become a chrominance difference signal V2 having a frequency band of 0.5 [MHz] as shown in FIG. 5(C).

According to the requirement determined by the design or standard of the TV receiver side, the passing bands of the LPFs 104, 115 and 117 may be set equal to or wider than those of the LPFs 109, 114 and 116, respectively. It is preferable to widen the frequency band of each of the LPFs 104, 115 and 117 to allow the signal passing therethrough to contain a more amount of information.

The chrominance difference signals U2 and V2 are subjected to a carrier-suppressing quadrature biphase amplitude modulation using an NTSC color subcarrier of 3.58 [MHz] by a quadrature biphase modulator 118 to become an NTSC carrier chrominance signal having a band width of 0.5 [MHz] as shown in FIG. 5(C). This NTSC carrier chrominance signal C2 is mixed with the NTSC luminance signal Y2 from the LPF 109 by a Y/C mixing circuit 111 to compose an NTSC composite video signal, which is fed to a VIDEO OUTPUT terminal 112 of the VTR 140.

The chrominance difference signals U1 and V1 are subjected to a carrier-suppressing quadrature biphase amplitude modulation using the NTSC color subcarrier to become a carrier chrominance signal having a band width of 0.75 [MHz] as shown in FIG. 5(B), which is fed to a chrominance signal output terminal 108 of the VTR 140.

The NTSC composite video signal is transmitted from the VIDEO OUTPUT terminal 112 through the transmission line 30 to the VIDEO INPUT terminal 205 of the color TV receiver 230 in the conventional manner. The luminance and carrier chrominance signals Y1 and C1 are transmitted separately from each other, as two separate component signals, from the luminance and chrominance output terminals 107 and 108 through the separate luminance and chrominance signal transmission lines 10 and 20 to the luminance and chrominance signal input terminals 201 and 202 of the color TV receiver 230, respectively.

The transmission in the form of the two separate component signals can provide the same advantages as those described in connection with the embodiments in FIGS. 1 and 2. The delay circuit 106 may be removed if no time-base error is caused, or placed between the modulator 119 and the terminal 108. Alternatively, the time-error correction may be done at the color TV receiver side.

The embodiment in FIG. 4 can be applied to the other TV standard system such as the PAL system and the SECAM system. Further, the pair of chrominance difference signals U and V may be replaced by the pair of chrominance difference signals I and Q. Furthermore, the VTR 140 may be replaced by any other video signal recording/reproducing apparatus including video disc players.

It should be understood that the embodiments described above are exemplary and not for limiting the scope of the present invention. Various changes and modifications may be made within the scope of the invention defined in the appended claims.

What is claimed is:

1. A system for connecting a video signal recording/reproducing apparatus and a color television receiver, comprising:
   said video signal recording/reproducing apparatus having a head for reproducing a color video signal recorded on a recording medium, a reproduced video signal processing circuit for processing the reproduced color video signal to obtain a luminance signal and a carrier chrominance signal from the reproduced color video signal, a mixing circuit for mixing the luminance and carrier chrominance signals to obtain a composite video signal, a first output terminal for outputting the luminance signal, a second output terminal for outputting the carrier chrominance signal, and a third output terminal for outputting the composite video signal; and said color television receiver having a first input terminal for receiving the luminance signal, a second input terminal for receiving the carrier chrominance signal, a third input terminal for receiving the composite video signal, a separation circuit connected to the third input terminal for separating the received composite video signal into a luminance signal and a carrier chrominance signal, a switching means for selectively passing one pair of the pair of the luminance and carrier chrominance signals received at the first and second input terminals and the pair of the luminance and carrier chrominance signals separated by the separation circuit, and a video signal processing circuit for processing the selected pair of luminance and carrier chrominance signals passed through the switching means to obtain R, G and B color signals, wherein the first through third output terminals and the first through third input terminals are adapted to be respectively connected to each other with separate first through third connection lines.

2. A system according to claim 1, wherein the video signal recording/reproducing apparatus further has a first filter provided between the reproduced video signal processing circuit and the first output terminal for passing the luminance signal so as to allow the luminance signal to have a first predetermined frequency band, a second filter provided between the reproduced video signal processing circuit and the second output terminal for passing the carrier chrominance signal so as to allow the carrier chrominance signal to have a second predetermined frequency band, and third and fourth filters provided between the reproduced video signal processing circuit for respectively passing the luminance and carrier chrominance signals so as to allow the luminance and carrier chrominance signals to respectively have third and fourth predetermined frequency bands.

3. A system according to claim 2, wherein frequency-passing band of the first filter is equal to or wider than that of the third filter, and frequency-passing band of the second filter is equal to or wider than that of the fourth filter.

4. A system according to claim 1, wherein the video signal recording/reproducing apparatus further has a time-base error correcting means provided between the reproduced video signal processing circuit and one of the first and second output terminals for correcting a time-base error between the luminance and carrier chrominance signals.

5. A system according to claim 1, wherein the switching means in the color television receiver comprises a manual selection switch which is operated manually for producing a selection signal, a first change-over switch responsive to the selection signal for selectively passing one of the luminance signal received at the first input terminal and the luminance signal separated by the separation circuit, and a second change-over switch responsive to the selection signal for selectively passing one of the carrier chrominance signal received at the second input terminal and the carrier chrominance signal separated by the separation circuit.

6. A system for connecting a video signal recording/reproducing apparatus and a color television receiver, comprising:

said video signal recording/reproducing apparatus having a head for reproducing a color video signal recorded on a recording medium, a reproduced video signal processing circuit for processing the reproduced color video signal to obtain a luminance signal and first and second chrominance difference signals from the reproduced color video signal, first and second low-pass filters for separating the luminance signal into first and second luminance signals, third and fourth low-pass filters for separating the first chrominance difference signal into two first chrominance difference signals, fifth and sixth low-pass filters for separating the second chrominance difference signal into two second chrominance difference signals, a first modulator for modulating a color subcarrier with one of the two first chrominance difference signals from the third low-pass filter and one of the two second chrominance difference signals from the fifth low-pass filter to obtain a first carrier chrominance signal, a second modulator for modulating the color subcarrier with the other of the two first chrominance difference signals from the fourth low-pass filter and the other of the two second chrominance difference signals from the sixth low-pass filter to obtain a second carrier chrominance signal, a mixing circuit for mixing the second luminance signal and the second carrier chrominance signal to obtain a composite video signal, a first output terminal for outputting the first luminance signal, a second output terminal for outputting the first carrier chrominance signal, and a third output terminal for outputting the composite video signal; and said color television receiver having a first input terminal for receiving the first luminance signal, a second input terminal for receiving the first carrier chrominance signal, a third input terminal for receiving the composite video signal, a separation circuit connected to the third input terminal for separating the received composite video signal into the second luminance signal and the second carrier chrominance signal, a switching means for selectively passing one pair of the pair of the first luminance and carrier chrominance signals received at the first and second input terminals and the pair of the second luminance and carrier chrominance signals separated by the separation circuit, and a video signal processing circuit for processing the selected pair of luminance and carrier chrominance signals passed through the switching means to obtain R, G and B color signals, wherein the first through third output terminals and the first through third input terminals are adapted to be respectively connected to each other with separate first through third connection lines.

7. A system according to claim 6, wherein frequency-passing bands of the first, third and fifth low-pass filters are equal to or wider than those of the second, fourth and sixth low-pass filters, respectively.

8. A system according to claim 6, wherein the video signal recording/reproducing apparatus further has a time-base error correcting means provided at one of a position between the first low-pass filter and the first output terminal and a position between the first modulator and the second output terminal for correcting a time-base error between the first luminance signal and the first carrier chrominance signal.

9. A system according to claim 6, wherein the switching means comprises a manual selection switch which is operated manually for producing a selection signal, a first change-over switch responsive to the selection signal for selectively passing one of the first and second luminance signals, and a second change-over switch responsive to the selection signal for selectively passing one of the first and second carrier chrominance signals.

10. A video signal recording-reproducing apparatus comprising:
   a head for reproducing a color video signal recorded on a recording medium;
   a reproduced video signal processing circuit for processing the reproduced color video signal to obtain a luminance signal and a carrier chrominance signal from the reproduced color video signal;
   a mixing circuit for mixing the luminance and carrier chrominance signals to obtain a composite video signal;
   a first output terminal for outputting the luminance signal;
   a second output terminal for outputting the carrier chrominance signal; and
   a third output terminal for outputting the composite video signal.

11. An apparatus according to claim 10, further comprising: a first filter provided between the reproduced video signal processing circuit and the first output terminal for passing the luminance signal so as to allow the luminance signal to have a first predetermined frequency band; a second filter provided between the reproduced video signal processing circuit and the second output terminal for passing the carrier chrominance signal so as to allow the carrier chrominance signal to have a second predetermined frequency band; and third and fourth filters provided between the reproduced video signal processing circuit for respectively passing the luminance and carrier chrominance signals so as to allow the luminance and carrier chrominance signals to respectively have third and fourth predetermined frequency bands.

12. An apparatus according to claim 11, wherein frequency-passing band of the first filter is equal to or wider than that of the third filter, and frequency-passing band of the second filter is equal to or wider than that of the fourth filter.

13. An apparatus according to claim 10, further comprising a time-base error correcting means provided between the reproduced video signal processing circuit and one of the first and second output terminals for correcting a time-base error between the luminance and carrier chrominance signals.

14. A video signal recording/reproducing apparatus comprising:
   a head for reproducing a color video signal recorded on a recording medium;
   a reproduced video signal processing circuit for processing the reproduced color video signal to obtain a luminance signal and first and second chrominance difference signals from the reproduced color video signal;
   first and second low-pass filters for separating the luminance signal into first and second luminance signals;
   third and fourth low-pass filters for separating the first chrominance difference signal into two first chrominance difference signals;
   fifth and sixth low-pass filters for separating the second chrominance difference signal into two second chrominance difference signals;
   a first modulator for modulating a color subcarrier with one of the two first chrominance difference signals from the third low-pass filter and one of the two second chrominance difference signals from the fifth low-pass filter to obtain a first carrier chrominance signal;
   a second modulator for modulating the color subcarrier with the other of the two first chrominance difference signals from the fourth low-pass filter and the other of the two second chrominance difference signals from the sixth low-pass filter to obtain a second carrier chrominance signal;
   a mixing circuit for mixing the second luminance signal and the second carrier chrominance signal to obtain a composite video signal.
   a first output terminal for outputting the first luminance signal;
   a second output terminal for outputting the first carrier chrominance signal; and
   a third output terminal for outputting the composite video signal.

15. An apparatus according to claim 14, wherein frequency-passing bands of the first, third and fifth low-pass filters are equal to or wider than those of the second, fourth and sixth low-pass filters, respectively.

16. An apparatus according to claim 14, comprising: a time-base error correcting means provided at one of a position between the first low-pass filter and the first output terminal and a position between the first modulator and the second output terminal for correcting a time-base error between the first luminance signal and the first carrier chrominance signal.

17. A color television receiver having:
   a first input terminal for receiving a luminance signal of a color video signal;
   a second input terminal for receiving a carrier chrominance signal of the color video signal;
   a third input terminal for receiving a composite video signal;
   a separation circuit connected to the third input terminal for separating the received composite video signal into a luminance signal and a carrier chrominance signal;
   a switching means for selectively passing one pair of the pair of the luminance and carrier chrominance signals received at the first and second input terminals and the pair of the luminance and carrier chrominance signals separated by the separation circuit;
   a video signal processing circuit for processing the selected pair of luminance and carrier chrominance signals passed through the switching means to obtain R, G and B color signals; and
   a display means receiving the R, G and B color signals for displaying a color television image.

18. A color television receiver according to claim 17, wherein the switching-means comprises: a manual selection switch which is operated manually for producing a selection signal; a first change-over switch responsive to the selection signal for selectively passing one of the luminance signal received at the first input terminal and the luminance signal separated by the separation circuit; and a second change-over switch responsive to the selection signal for selectively passing one of the carrier chrominance signal received at the second input terminal and the carrier chrominance signal separated by the separation circuit.

19. A color television receiver according to claim 17, wherein the first through third input terminals are adapted to be connected to a video signal recording/reproducing apparatus with separate first through third connection lines.

* * * * *